H. M. Myers.
Making Shovels.
Nº 64,756.   Patented Feb. 5, 1867.
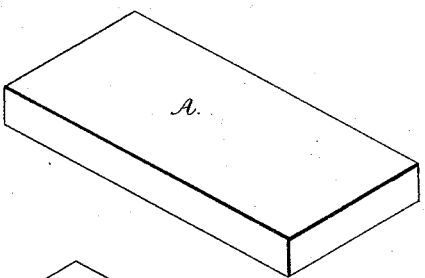
Fig. 1.
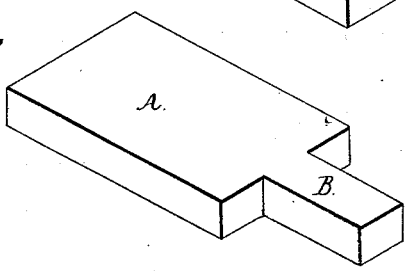
Fig. 2.
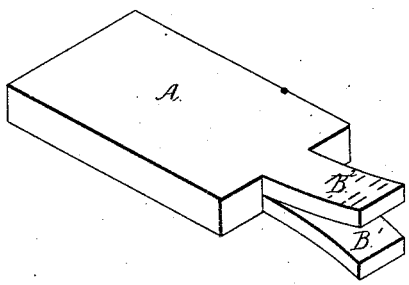
Fig. 3.
Fig. 4.
Fig. 5.
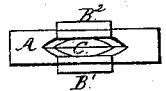
Fig. 6.
Witnesses.
James McBride.
James J. Johnston.
Inventor.
Henry M. Myers.
THE GRAPHIC CO.PHOTO-LITH.39 & 41 PARK PLACE, N.Y.

United States Patent Office.

HENRY M. MYERS, OF ALLEGHENY CITY, PENNSYLVANIA.

*Letters Patent No. 61,756, dated February 5, 1867.*

---

IMPROVED MODE OF CONSTRUCTING SHOVELS.

---

The Schedule referred to in these Letters Patent and making part of the same.

---

TO ALL WHOM IT MAY CONCERN:

Be it known that I, HENRY M. MYERS, of the city and county of Allegheny, and State of Pennsylvania, have invented a new and useful improvement in the Mode of Constructing "Shovels;" and I do hereby declare the following to be a full and exact description thereof, reference being had to the accompanying drawings, and to the letters of reference marked thereon.

My invention consists in a new mode of forming the straps and socket for the handle of "shovels," said straps and socket being formed in the manner hereinafter described.

To enable others skilled in the art to make and use my invention, I will proceed to describe its construction and operation. In the accompanying drawings, which form part of my specification—

Figure 1 represents the block or blank from which the shovel blade and the straps for the handle are formed.

Figure 2 represents the block or blank after the tang is forged on it for the handle straps.

Figure 3 represents the tang after it is split and prior to forming the socket for the end of the shovel blade.

Figure 4 represents an end view of the block after the tang is split and the socket for the end of the handle is formed.

Figure 5 represents a longitudinal section of the block or blank after the tang is forged, split, and the socket is formed for the end of the shovel handle.

Figure 6 represents a longitudinal section of the block or blank after the tang is forged, split, and socket formed, and the straps drawn or forged to the desired thickness.

In the drawings, A represents that portion of the block or blank from which the shovel blade is made. B represents the tang which is formed by heating and then forging the block, represented in fig. 1, into the form represented in fig. 2; after which the tang, by any of the known means, is split, as shown in fig. 3; then, by means of suitable tools, the socket C is made for receiving the end of the shovel handle. I then fill the socket C with sand or fine cinders and close together the parts marked $B^1$ $B^2$ and heat them to the proper degree and forge them to the proper thickness, as shown in fig. 6. I then heat the part marked A and forge out the shovel blade, and then finish the shovel in the usual manner. By this mode of forging the straps $B^1$ and $B^2$ and forming the socket for the handle I obviate the necessity of welding the straps to the shovel blade, which is an advantage that will be apparent to every mechanic who is skilled in the art of forging and manufacturing shovels. The ordinary way of forging out shovels is to forge the blade and the upper strap for the handle in one piece, and then weld the lower strap to the shovel blade, this lower strap being made so that it will form part of the socket for the end of the handle.

This mode of constructing shovels is attended with much labor and trouble, and requires great care in heating the parts to that degree which is proper for making a good weld; and it is a very common thing for the workmen to destroy the strength and tenacity of the iron or steel in heating for the purpose of welding the parts together; and the burning of this iron or steel is the most frequent cause of shovels breaking at the point where the handle strap is united to the blade by the welding process. Now, the object of my invention is to overcome this trouble, labor, and liability of burning the stock in constructing shovels. This I accomplish by forming the shovel in the manner described.

Having thus described the nature, construction and operation of my improvement, what I claim as of my invention is—

Forming the straps on and socket (for the handle) in the stock or "blank" from which the shovel blade is formed, said straps and socket being formed in the manner herein described for the purpose of avoiding the old practice of forging and welding.

HENRY M. MYERS.

Witnesses:
JAMES J. JOHNSTON,
ALEXANDER HAYS.